United States Patent [19]

Halasa et al.

[11] 4,219,627

[45] Aug. 26, 1980

[54] PROCESS FOR THE PREPARATION OF BLOCK COPOLYMERS

[75] Inventors: Adel F. Halasa, Bath; James E. Hall; Adolph Para, both of Akron, all of Ohio

[73] Assignee: The Firestone Tire & Rubber Company, Akron, Ohio

[21] Appl. No.: 776,047

[22] Filed: Mar. 9, 1977

[51] Int. Cl. ............................................. C08f 297/04
[52] U.S. Cl. ..................................................... 525/89
[58] Field of Search ..................... 260/876 B, 880 B; 526/346; 525/89

[56] References Cited

U.S. PATENT DOCUMENTS

| | | | |
|---|---|---|---|
| 3,231,635 | 1/1966 | Holden | 260/880 B |
| 3,265,765 | 8/1966 | Holden | 260/880 B |
| 3,402,160 | 9/1968 | Hayes | 526/346 |
| 3,427,364 | 2/1969 | Shaw | 260/876 B |
| 3,956,419 | 5/1976 | Murray | 260/880 B |
| 3,957,914 | 5/1976 | Baumgartner | 260/880 B |
| 3,972,963 | 8/1976 | Schwab | 260/876 B |

Primary Examiner—Paul R. Michl

[57] ABSTRACT

The process described herein involves the preparation of block copolymers of the S-B-S type wherein S represents a block of polystyrene and B represents a block of polybutadiene. In order to have the initial polystyrene block soluble in the polymerization medium, cyclohexane and aromatic hydrocarbons have been used as the diluent or solvent in these polymerizations. The present process permits the use of hexane as diluent by having dissolved therein prior to polymerization a small amount of the S-B-S type of block copolymer being produced in the polymerization. Advantageously this solution used as the polymerization medium is prepared merely by washing the reactor used in a previous polymerization for production of the same type of S-B-S block copolymer with hexane to dissolve solid residues of S-B-S block copolymer deposited on the wall or agitator of the reactor. This hexane solution is then retained in the reactor to serve as the medium for the next polymerization batch. The dissolved S-B-S copolymer serves as a suspension agent for dispersion of the initial polystyrene block.

12 Claims, No Drawings

PROCESS FOR THE PREPARATION OF BLOCK COPOLYMERS

BACKGROUND OF THE INVENTION

1. Field of the Invention

This invention relates to a process for the preparation of block copolymers of the S-B-S type wherein S represents a polystyrene block and B represents a polybutadiene block. More specifically, this invention relates to a process in which hexane is used as the polymerization medium. Still more specifically, this process relates to the use as polymerization medium of a hexane solution of the S-B-S type of block copolymer being produced to give solubility or dispersibility to the initial block of polystyrene.

2. Related Prior Art

Block copolymers of the S-B-S type are known and are considered to be of great utility as self-curing elastomers or as modifiers for diene elastomers. These have a central core of polybutadiene and two terminal blocks of polystyrene. However, in view of the greater insolubility or non-dispersibility of the initial polystyrene block, a solvent such as an aromatic hydrocarbon or cyclohexane has been used in its preparation.

This problem is recognized in British Pat. No. 1,130,770 which states on page 2, lines 60-65, "In each of these processes, however, a vinyl aromatic hydrocarbon is required to be first polymerized and therefore the polymerization solvent used must be wholly or mainly a naphthenic or aromatic hydrocarbon solvent".

Similar recognition of this solubility problem is indicated in U.S. Pat. Nos. 3,231,635, 3,265,765 and 3,427,364 wherein statements are made regarding the necessity to use aromatics or naphthenic solvents or mixtures of these with other solvents.

Hayes U.S. Pat. No. 3,402,160 describes the suspension polymerization of styrene in hexane to form polystyrene whereby a soluble diene or diene-styrene random copolymer having at least 50% diene is used as a suspension agent. No mention is made of S-B-S type block copolymers nor of their production by such a process. The patentee describes the improvement in impact strength of the polystyrene resulting from the embodiment of the diene polymer suspension agent in the polymer product. In this case the resulting impurity in the product produces a desirable result. In cases where patentee's type of suspension agent is undesired in the final product or produces undesirable results therein, patentee's process could be unsatisfactory.

Because of its lower boiling point and the resultant energy savings in the use of hexane as compared to benzene and cyclohexane, it is desirable to have a process designed to permit the use of hexane in preparing the S-B-S block copolymers without modification of the properties of the product by the introduction of foreign types of materials used as suspension agents. Moreover, the use of a process conducted in hexane makes it adaptable for use in equipment designed for the preparation of polybutadiene in hexane and for the recovery of hexane therefrom.

STATEMENT OF THE INVENTION

In accordance with the present invention it has been found possible to improve the dispersibility of the initial polystyrene block in forming an S-B-S type of copolymer by using as the polymerization medium a hexane solution of the S-B-S type of block copolymer to be ultimately prepared. This hexane solution may be prepared by dissolving in hexane the appropriate amount of S-B-S block copolymer from a previous run or by adding hexane to a reactor which has been used in making a previous batch of S-B-S polymer in which reactor there are solid residues deposited on the wall or agitator or agitator shaft. Then the resulting hexane solution is retained in the reactor and used as the dispersion medium for the next polymerization. It is also appropriate at the conclusion of one polymerization to retain a portion of the product solution to be added to the reactor for a subsequent polymerization. The amount of S-B-S used in the hexane for suspension purposes is 0.1-10%, preferably 0.5-5% of the weight of styrene added for formation of the first polystyrene block. Even more may be used since it is recovered as part of the product and, because of its similarity or identical nature, has no adverse effects on the product.

The process of this invention involves the same or similar techniques as previously used in the preparation of S-B-S polymers except that hexane is used as the solvent and a small amount of a similar type of S-B-S block copolymer from a previous polymerization is added prior to the addition of the amount of styrene used for the formation of the first polystyrene block.

As in previous practice, a hydrocarbyl lithium, preferably a secondary or tertiary alkyl lithium, is used as the initiator. To the polymerization system containing an appropriate amount of initiator is added the appropriate amount of styrene to give the desired molecular weight in the first polystyrene or S block. Polymerization is continued until conversion of the styrene monomer to polymer is substantially completed. Then butadiene is added to form the middle polybutadiene block. At the end of this block formation, the copolymer has the structure:

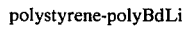

polystyrene-polyBdLi

At this point the polymer may be coupled with any one of the well-known coupling agents such as an alkane dichloride of 1-10 carbon atoms, carbon monoxide, $CCl_4$, $SiCl_4$, $PNCl_2$, divinylbenzene, sec.-butyl chloride, $CCl_3COOEt$, etc. to give the block copolymer having the structure:

polystyrene-polyBD-polystyrene

In this product the residue of the coupling agent is in the middle of the polyBd block. Since it is so minute compared to the size of the total copolymer it has no noticeable effect on the characteristics of the block copolymer. The amount of butadiene used in preparing the polyBd block which is to be coupled is half the amount needed to give the desired molecular weight in the ultimate polyBd block in the final block copolymer.

When the coupling agent is difunctional such as with the alkane dichlorides, carbon monoxide, $PNCl_2$, etc., the coupled product is of the true S-B-S type. However when the coupling agent is trifunctional, tetrafunctional or of higher functionality such as with $CCl_4$, $SiCl_4$, divinylbenzene, $CCl_3COOEt$, etc., and the appropriate amount is used, the coupled product may be represented as $SB(-S^*)_X$ where X may be an integer having a value of 2,3 or more. Where this formula is used to include the products obtained with difunctional coupling agents or polyfunctional agents used in difunctional proportion, X has a value of one. Therefore, the value of X is generally defined as having a value of 1 to 3.

The appropriate amount of coupling agent is calculated on the amount needed to react with the number of lithium atoms present in the polymer. For example with a tetrafunctional coupling agent, such as $CCl_4$, one-fourth of the molecular weight of $CCl_4$ is calculated as required for each molecule of polymer or in other words, each atom of lithium present. When it is desired to use a tetrafunctional agent as a difunctional agent the appropriate amount is used, for example, one-half of the molecular weight of $CCl_4$ for each molecule of polymer or for each atom of lithium. Substantial coupling may be effected within an hour but a longer period may be used to insure more complete coupling.

As previously mentioned, the residue of the coupling agent is buried in the middle of a B or polybutadiene block and is so minute in comparison with the bulk of the polybutadiene block that it has no noticeable effect on the properties of the block copolymer. Moreover, when a trifunctional or higher functional coupling agent is used in appropriate amounts, the resultant center polybutadiene block may be branched in accordance with the functionality of the coupling group. For example a trifunctional coupling agent may produce a triple branched polybutadiene whereas a tetrafunctional coupling agent, such as $CCl_4$ may produce a four-branched polybutadiene center block, depending on the proportions used. As a by-product, the Li is removed by reaction with chlorine and precipitated.

If desired the coupling step may be omitted and the ultimate block copolymer may be prepared by using sufficient butadiene to form the desired molecular weight in the ultimate middle polyBd block and when this formation is completed the appropriate amount of styrene is added to form the second polystyrene block. Then the Li is deactivated and removed by the addition of appropriate agents for this purpose, such as an alcohol, water, etc. The resultant block copolymer has the structure:

polystyrene-polyBd-polystyrene

The dienes which may be used in preparing the initial small polydiene block are preferably conjugated dienes having 4–8 carbon atoms such as butadiene-1,3; isoprene; pentadiene-1,3; 2,3-dimethylbutadiene-1,3; etc. While butadiene-1,3, herein referred to as butadiene, is preferred for the middle polyBd block, the other conjugated dienes listed above may be used for this purpose. Moreover, although vinyl toluene may be used in place of some or all of the styrene in the S blocks, styrene is preferred.

In referring to "hexane" it is intended to include any of the various hexane isomers, such as n-hexane, isohexane and the various other isomers, either individually or as mixtures with each other. Commercial grades which contain predominantly hexanes are also satisfactory.

Moreover, while normal alkyl, aryl and cycloalkyl lithium may be used as initiators, those preferred are the secondary and tertiary alkyl lithium compounds having 4–8 carbon atoms per molecule. These include the secondary-butyl, tertiary-butyl, tertiary-amyl, tertiary-hexyl, etc. In view of their faster activity, the secondary and tertiary alkyl lithiums are preferred. The lithium compounds suitable for this purpose are referred to as hydrocarbyl lithium compounds having up to 10 carbon atoms.

The amount of initiator to be used depends on the amount of monomer used and the molecular weights desired in the respective products. Under ideal conditions, where the polymerization system is free of impurities that will deactivate a portion of the initiator, the amount of initiator is determined by the amount of monomer being used for the initial block and the molecular weight desired in that block. Generally in such polymerizations, each initiator molecule (or lithium atom) is responsible for the initiation of one polymer chain. Then for subsequent blocks, and providing no deactivating impurities have entered the system, sufficient monomer is added in each case to form the desired molecular weight in the respective blocks in accordance with the number of atoms of lithium present in the polymer being formed.

The desirability for close control over the molecular weight of each of the individual blocks is emphasized by the several major utilities desired for these products. The block polymers per se are strikingly useful as "self-vulcanizing" elastomers when the correct relationship exists between the proportions of the elastomeric to non-elastomeric blocks and the individual molecular weights thereof. If the molecular weights of the plastic (non-elastomeric) blocks such as the polystyrene blocks are unduly high, or present in too high a proportion relative to the elastomeric blocks, the copolymer exhibits relatively poor elastomeric properties although it may be useful for other purposes such as adhesives or high impact resistant replacements for the usual thermoplastics such as polystyrene, polyethylene and the like.

Another reason for maintaining close control over the individual block lengths is that there is a relatively critical relationship between the block lengths and the effectiveness of the block copolymer in modifying other elastomers. In the latter instance, the principal object is to improve the green strength and processability characteristics of other elastomers. This objective is not realized to a maximum if the correct block lengths are not obtained. Therefore, even if the average molecular weight of the individual block is within a target area, it has been found that this is not fully satisfactory if the average is merely that of a relatively wide spread in molecular weights. On the contrary, it is highly desirable to achieve polymer segments in which the molecular weights of the individual blocks are within a relatively narrow range. These objectives are better obtained by the use of secondary or tertiary alkyl lithium initiators.

The molecular weights of the individual blocks may be varied as stated hereinbefore, dependent upon the intended end use. For many purposes, such as use of the block copolymers as self-curing elastomers or for modification of other elastomers, it is preferred to employ block polymers having the structure S-B-S wherein each S is an independently selected polymer block of styrene, the average molecular weight of each S being between about 10,000 and 100,000, and B is a polymer block of a conjugated diene, the average molecular weight of the block being between about 30,000 and 150,000, the combined weight of the S blocks preferably being less than about 50% by weight of the total copolymer.

The block copolymers may be modified with extending oils, particularly those which are compatible with the elastomeric segment, or with pigments or polystyrene, or poly(alphamethylstyrene), any of which may be present in amounts between about 0 and 100 parts by weight per 100 parts of the block copolymer.

Polymerization is advantageously conducted at temperatures in the range of −20° to about 100° C., preferably at temperatures between about 20° and 65° C., the temperature being controlled to yield the polymer product within a reasonable length of time.

While conducting the polymerization it is generally satisfactory to use 200–900 parts by weight of hexane per 100 parts of monomer. This gives a fluid polymer solution or dispersion which can be easily handled.

Polymerization is advantageously performed in an agitated, pressurized reactor which may be jacketed to allow for temperature control. Pressures are generally autogenous, although inert gases can be charged to the reactor to increase the pressure, if desired. Dry nitrogen, argon, helium or other inert gas can be used for this purpose. Normally pressures will be atmospheric or above, and can be as high as 10 atmospheres or more.

Polymerizations are generally performed in from 0.1 to 6 hours, preferably 0.5 to 5 hours, with the reaction proceeding essentially to completion.

Samples may be withdrawn from the reactor periodically during the polymerization to determine percent conversion (by measuring the total solids), color and character of the reaction mass, etc.

When the polymerization has progressed to the desired degree, the product is dropped or run into isopropanol or other medium which deactivates the initiator and precipitates the polymer product. Generally an amount of isopropanol equal in weight to the amount of hexane used is satisfactory for this purpose. It is advantageous also to have an antioxidant, such as approximately 1% of di-tertiarybutyl-para-cresol, in the isopropanol. The polymer precipitate is recovered and drum-dried to remove solvent.

The elastomers produced according to this invention may be mixed with the usual rubber compounding materials such as carbon blacks, fillers, processing oils and the like and still provide satisfactory physical properties. Preferably the elastomeric mid-sections of the block copolymer should have lengths corresponding approximately to the average molecular weight between crosslinks of normal vulcanized rubber. Since the subject block copolymers may be utilized without vulcanization, the molecular weights of the end groups should be high enough to prevent movement of the chain ends under the applied stress in the time intervals of its application.

The subject block copolymers are not only useful per se for the formation of injection moldings, compression moldings, extrusions, film coatings, spray coatings or adhesives, but also for the formation of latices from which foam or dipped goods may be prepared as well as in compositions with other rubbers for the improvement in physical properties of the latter.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I (a) Into a freshly cleaned 2-gallon stainless steel reactor equipped with inlet and outlet means, an agitator and means for reading and controlling the temperature, there is added under a nitrogen atmosphere a solution containing 0.003 lbs. of S-B-S and 5 lbs. of hexane. The S-B-S is similar to that being prepared in this example and was obtained from a previously prepared batch. Then 1.23 lbs. of a 45.4% solution of styrene in hexane is added (0.56 lbs. of styrene). Then 10 millimoles of sec.-butyl lithium is added as a hexane solution. Polymerization is effected with stirring at 150° F. (65° C.) until conversion is substantially complete. At this time the color of the solution is yellow. Then to this is added 5.73 lbs. of a 22% solution of butadiene in hexane (1.26 lbs. of butadiene). The yellow color disappears and solution viscosity increases as the butadiene is polymerized. Polymerization is continued at 150° F. to substantially complete conversion. The temperature is lowered and three increments of 1.3 millimoles each of $CCl_4$ are added. The resultant product is thereby coupled at 180° F. overnight with the 3.9 millimoles of $CCl_4$ to give an S-B(-S)$_x$ product which is recovered by running the reaction solution, after cooling, into an equal volume of isopropanol containing 1% by weight of di-butyl-p-cresol. The precipitated product is drum-dried to give a 76% yield and has 24.3% styrene of which 94% is block polystyrene, DSV of 2.46, 0% gel, molecular weight of 66,000 and $M_w/M_n$ of b 5.958.

(b) After the above preparation, the reactor has S-B-S polymer deposits on the wall and on the agitator shaft above the liquid level. Five lbs. of hexane is added to the reactor and stirred to dissolve these deposits. Analysis of a sample of the resulting solution shows the solution to contain 0.05% of the SBS polymer which calculates to a total of 0.0025 lbs. of S-B-S or 0.44% based on the weight of the polystyrene to be inserted in the first block. Then this S-B-S hexane solution is used as the polymerization medium in a repetition of the above procedure (a).

EXAMPLE II

The procedure of I(b) is repeated using the polymer deposits from Example I(b) and using an equivalent amount of n-BuLi to give a yield of 86% of an S-B(-S)$_x$ product having a DSV of 4.17, 0% gel, 25.3 percent styrene of which 100% is block polystyrene, a molecular weight of 79,400 and an $M_w/M_n$ of 13.65.

EXAMPLE III

The procedure of Example II is repeated with similar results using the polymer deposits from Example II and using an equivalent amount of t-BuLi in place of the n-BuLi.

EXAMPLE IV

The procedure of Example I(a) is repeated with similar results using as the coupling agent 2,3-dichlor-n-butane, carbon monoxide, $CCl_3COOEt$ and $PNCl_2$, respectively, using, in each case, one-half molar equivalent per atom of lithium in the polymer.

EXAMPLE V

The procedure of Example I(a) is repeated with similar results using an equivalent amount of $SiCl_4$ in place of the $CCl_4$.

EXAMPLE VI

The procedure of Example I(a) is repeated except that double the amount of butadiene is used and instead of using a coupling agent, a second block of polystyrene is formed by adding 0.60 lbs. of styrene in hexane after the polymerization of the butadiene is substantially completed. This produces an S-B-S block copolymer having 24.6 percent styrene of which 95% is block polystyrene and a molecular weight of 34,000.

When the products of Examples I–VI are tested in tire compositions either by themselves or blended with commercially used elastomers, they are found to serve satisfactorily for this purpose.

In some cases it may be desirable to have the center or polybutadiene block one of mixed butadiene and styrene or made by random copolymerization. In such cases, a mixture of butadiene and styrene may be added gradually during the formation of this block, or the styrene may be added first and butadiene added gradually. In this way the copolymerization of styrene during the formation of the central block is ensured.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims:

What is claimed is:

1. In the process of preparing S-B-S block copolymers, wherein S represents a block of polystyrene and B represents a block of polybutadiene, by the steps of polymerizing the individual monomers to form the respective blocks, such polymerizations being initiated by a lithium compound, the improvement whereby:
   (a) said polymerization is initiated by a hydrocarbyl lithium compound having up to 10 carbon atoms,
   (b) said polymerization is conducted in a solution of the same S-B-S block copolymer dissolved in a solvent consisting essentially of hexane, the amount of said copolymer comprising 0.1–10 parts by weight per 100 parts of styrene to be incorporated in the first S block of the S-B-S polymer to be formed;
   (c) sufficient styrene is added to the said solution of S-B-S block copolymer in hexane to give the desired molecular weight of the first S block and thereafter effecting polymerization of said styrene to give the product polystyrene-Li while still dispersed in said hexane;
   (d) thereafter adding an appropriate amount of butadiene to the dispersed product of step (a) to form a desired size block of polybutadiene and effecting polymerization of said butadiene with said polystyrene-Li to give the product polystyrene-polybutadiene-Li while still dispersed in said hexane, and
   (e) thereafter effecting the addition of a second block of polystyrene onto said polystyrene-polybutadiene-Li.

2. The process of claim 1 in which the addition of said second block of polystyrene is effected by the reaction of a coupling agent with said polystyrene-polybutadiene-Li.

3. The process of claim 1 in which said second block of polystyrene is added by effecting polymerization of an additional amount of styrene with said polystyrene-polybutadiene-Li.

4. The process of claim 2 in which said coupling agent is selected from the class consisting of $CCl_4$, secondary-butyl chloride, carbon monoxide, an alkyl dichloride of 1–10 carbon atoms, $SiCl_4$, $PNCl_2$, divinylbenzene and $CCl_3COOR$ where R is an alkyl group of 1–10 carbon atoms.

5. The process of claim 4 in which said coupling agent is $CCl_4$.

6. The process of claim 4 in which said coupling agent is divinylbenzene.

7. The process of claim 4 in which said coupling agent is secondary-butyl chloride.

8. The process of claim 1 in which said hydrocarbyl lithium compound is selected from the class consisting of secondary and tertiary alkyl lithium compounds of 4–8 carbon atoms.

9. The process of claim 1 in which said hydrocarbyl lithium compound is a secondary alkyl lithium compound of 4–8 carbon atoms.

10. The process of claim 1 in which said hydrocarbyl lithium compound is secondary-butyl lithium.

11. The process of claim 1 in which the initial solution of S-B-S block copolymer in hexane is prepared by dissolving solid residues of S-B-S polymer from a reactor previously used in the preparation of S-B-S polymer.

12. The process of claim 1 in which the amount of said S-B-S block copolymer initially dissolved in hexane is 0.5–5 parts by weight per 100 parts of styrene to be incorporated in the first S block.

* * * * *